(12) United States Patent
Koto et al.

(10) Patent No.: US 7,226,976 B2
(45) Date of Patent: Jun. 5, 2007

(54) LATENT CURING AGENT FOR EPOXY RESIN, AND CURABLE EPOXY RESIN COMPOSITION

(75) Inventors: Hiroyasu Koto, Kawasaki (JP); Junji Ohashi, Kawasaki (JP); Hiroshi Sakamoto, Kawasaki (JP); Masato Kobayashi, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 11/110,731

(22) Filed: Apr. 21, 2005

(65) Prior Publication Data

US 2005/0187371 A1 Aug. 25, 2005

Related U.S. Application Data

(63) Continuation of application No. 10/145,732, filed on May 16, 2002, now abandoned.

(30) Foreign Application Priority Data

May 16, 2001 (JP) .............................. 2001-145801

(51) Int. Cl.
C08L 33/04 (2006.01)
C08L 33/24 (2006.01)
C08L 63/00 (2006.01)
C08L 63/02 (2006.01)

(52) U.S. Cl. .................. 525/218; 525/57; 525/107; 525/108; 525/132; 525/176; 525/217

(58) Field of Classification Search .................. None
See application file for complete search history.

(56) References Cited

U.S. PATENT DOCUMENTS

| 4,066,625 A | 1/1978 | Bolger |
| 4,133,790 A | 1/1979 | Sekmakas et al. |
| 4,268,656 A | 5/1981 | Ray-Chaudhuri et al. |
| 4,294,939 A | 10/1981 | Taniguchi et al. |
| 4,866,133 A | 9/1989 | Andrews et al. |
| 5,480,720 A | 1/1996 | Eisenhart et al. |
| 2002/0016411 A1 | 2/2002 | Ando et al. |

FOREIGN PATENT DOCUMENTS

| EP | 0 950 677 A2 | 10/1999 |
| JP | 56-155222 | 12/1981 |
| JP | 57-100127 | 6/1982 |
| JP | 57-119921 A | 7/1982 |
| JP | 59-53526 | 3/1984 |
| JP | 61 111944 A | 5/1986 |
| JP | 3-296525 | 12/1991 |
| JP | 6-16998 A | 1/1994 |

*Primary Examiner*—Robert Sellers
(74) *Attorney, Agent, or Firm*—Oblon, Spivak, McClelland, Maier & Neustadt, P.C.

(57) ABSTRACT

Provided are a latent curing agent that gives an epoxy resin composition with improved storage stability and low-temperature curability; and a curable epoxy resin composition prepared by mixing the said curing agent and an epoxy compound. The epoxy resin composition has improved storage stability, and cures at lower temperatures for a shorter period of time than conventional ones. The latent curing agent for epoxy resin comprises two components, (A) a radically polymerized polymer of a monomer having at least a polymerizable double bond, which has at least a tertiary amino group in the molecule, and (B) a polymer having at least a hydroxyl group in the molecule, and forms a solid solution that is solid at 25° C.

17 Claims, No Drawings

LATENT CURING AGENT FOR EPOXY RESIN, AND CURABLE EPOXY RESIN COMPOSITION

This application is a continuation of U.S. application Ser. No. 10/145,732 (now abandoned), filed on May 16, 2002, which claims priority to Japanese Patent Application No.2001-145801, which was filed on May 16, 2001, and is incorporated herein by reference in its entirety.

CROSS REFERENCES TO RELATED APPLICATIONS

This application claims priority to Japanese Patent Application No.2001-145801, which was filed on May 16, 2001, and is incorporated herein by reference in its entirety.

BACKGROUND OF THE INVENTION

1. Field of the Invention

The present invention relates to latent curing agents for epoxy resin, and to a curable epoxy resin compositions which contain such an agent. More precisely, the present invention relates to latent, epoxy resin-curing agents that exhibit good storage stability and low-temperature rapid curability of epoxy resin compositions containing it, and relates to curable epoxy resin compositions which contain such an agent and exhibit good storage stability and low-temperature rapid curability. The present invention further relates to methods for preparing articles by curing such an epoxy resin composition and the articles thereby obtained.

2. Discussion of the Background

Recent remarkable developments in electronics have made it possible to greatly increase the degree of integration of semiconductor IC chips and have enabled mass-scale production of IC devices. With that, small-sized, thin and high-quality electronic appliances now enjoy great popularity. With the recent popularization of such electronic appliances, one important problem is how to increase the mass-scale productivity of the products and to lower the production costs thereof. Epoxy resin compositions are used as the adhesive for electronic appliances, and they require a latent, epoxy resin-curing agent. However, it is much desired to further improve the quality of the curing agent. Needless-to-say, however, the applications of epoxy resins are not limited to the electronic industry.

Epoxy resin compositions are grouped into two types. One type is a two-package composition in which the main component epoxy resin and a curing agent are mixed just before use, and the other type is a one-package composition in which the main component epoxy resin is previously mixed with a curing agent. The latter one-package composition is preferred for the reason that it is free from the problems associated with incorrect mixing of the constituent components and it is applicable to automation lines driven by machine. One-package epoxy resin compositions require a curing agent which does not react with an epoxy resin compound at room temperature but, when heated, starts to react with the epoxy compound to cure it. This type of curing agent is referred to as a latent curing agent.

Some latent curing agents for epoxy resin have been proposed. Typical examples are dicyandiamides, dibasic acid dihydrazides, boron trifluoride amine complexes, guanamines, melamines, and imidazoles. Epoxy resin compositions prepared by mixing any of dicyandiamides, melamines, or guanamines with an epoxy compound have good storage stability, however they require long term curing at a high temperature not lower than 150° C. Combining the composition with a cure accelerator to shorten the curing time is one general technique in the art. The cure accelerator is effective for shortening the curing time of epoxy resin compositions containing it, however its addition significantly reduces the storage stability of the compositions. Epoxy resin compositions containing a latent curing agent selected from a group consisting of dibasic acid dihydrazides and imidazoles can cure at relatively low temperatures, however their storage stability is not good. Boron trifluoride amine complexes are corrosive and have some negative influences on the properties of the cured products of epoxy resin compositions containing them. Under these circumstances, a latent curing agent for epoxy resin that produces epoxy resin compositions having good storage stability and low-temperature rapid curability is highly desired.

To solve the problems mentioned above, a curing agent of a dialkylamine adduct with an epoxy compound is proposed in Japanese Patent Laid-Open Nos. 155222/1981 and 100127/1982; and a curing agent of an aminoalcohol or an aminophenol adduct with an epoxy resin is proposed in Japanese Patent Laid-Open No. 53526/1984. U.S. Pat. Nos. 4,066,625 and 4,268,656 disclose a curing agent of an imidazole compound or an N-methylpiperazine with an epoxy compound added to its secondary amino group. However, the curing agents produced according to the methods disclosed are problematic in that, when they are added to epoxy resin compositions to improve the low-temperature curability of the compositions, they reduce the storage stability of the compositions and therefore shorten the shelf life or the pot life of adhesives and coating materials that contain the epoxy resin composition. Japanese Patent Laid-Open No. 296525/1991 discloses a one-package epoxy resin composition that contains a curing agent prepared through thermal reaction of an epoxide having more than one epoxy group on average in the molecule, an N,N-dialkylaminoalkylamine, a cyclic amine with an active hydrogen-containing nitrogen atom in the molecule, and a diisocyanate. However, the epoxy resin composition proposed in this publication is still unsatisfactory in view of its low-temperature curability and storage stability. Moreover, nothing is disclosed in these prior art references about to the curability of the composition at a temperature of 70° C. or lower.

Thus, there remains a need for improved latent curing agents for epoxy resin compositions which afford epoxy resin compositions which exhibit improved shelf or pot life and may be cured at low temperatures. There also remains a need for epoxy resin compositions which contain such a latent curing agent and for methods for preparing article by curing such an epoxy resin composition.

SUMMARY OF THE INVENTION

Accordingly, it is one object of the present invention to provide latent curing agents that produces an epoxy resin composition having good storage stability and low-temperature curability.

It is another object of the present invention to provide curable epoxy resin compositions prepared by mixing such an agent and an epoxy compound, and which exhibit good storage stability and are curable for a shorter period of time at lower temperatures than conventional epoxy resin compositions.

It is another object of the present invention to provide methods for preparing articles by curing such an epoxy resin composition.

These and other objects, which will become apparent during the following detailed description, have been achieved by the inventors' discovery that a curable epoxy resin composition prepared by mixing a latent curing agent for epoxy resin, which comprises two components of:

(A) a radically polymerized polymer of a monomer having at least a polymerizable double bond, which polymer has at least one tertiary amino group in the molecule, and (B) a polymer having at least one hydroxyl group in the molecule, and forms a solid solution that can be solid at 25° C., and an epoxy compound has good storage stability and low-temperature rapid curability.

DETAILED DESCRIPTION OF THE PREFERRED ENBODIMENTS

The present invention is now described in detail. In a first embodiment, the present invention provides novel latent curing agents, which comprise:

(A) a radically polymerized polymer of a monomer having at least one polymerizable double bond, which polymer has at least one tertiary amino group in the molecule, and (B) a polymer having at least one hydroxyl group in the molecule, wherein said radically polymerized polymer of a monomer having at least a polymerizable double bond and said polymer having at least a hydroxyl group in the molecule form a solid solution that is solid at 25° C.

Thus, one component (A) of the curing agent of the present invention is a radically polymerized polymer of a monomer having at least one polymerizable double bond, and it has at least one tertiary amino group in the molecule. For introducing the at least one tertiary amino group into the molecule of the polymer, various methods are applicable. For example, an acrylate and/or methacrylate monomer may be used as a part of the monomer to be radically polymerized, and the resulting polymer may be reacted with an at least one tertiary amino group-containing alcohol compound for transesterification at the ester group in the polymer to introduce the tertiary amino group(s) into the polymer; or an acrylate and/or methacrylate monomer may be used as a part of the monomer to be radically polymerized, and the resulting polymer may be reacted with an at least one tertiary amino group-containing amine compound for ester-amide exchange at the ester group in the polymer to introduce the tertiary amino group(s) into the polymer; or a monomer having both at least one polymerizable double bond and at least one tertiary amino group in the molecule may be radically polymerized.

The acrylate compound to be used in the process that comprises transesterification or ester-amide exchange to introduce at least one tertiary amino group into the radically polymerized polymer may be, for example, methyl acrylate, isoamyl acrylate, 2-ethylhexyl acrylate, lauryl acrylate, benzyl acrylate, phenoxyethyl acrylate, isobornyl acrylate, or methoxydipropylene glycol acrylate; and the methacrylate compound to be used in the process may be, for example, methyl methacrylate, n-butyl methacrylate, i-butyl methacrylate, 2-ethylhexyl methacrylate, lauryl methacrylate, benzyl methacrylate, or cyclohexyl methacrylate.

Examples of the tertiary amino groups are a dialkylamino group such as a dimethylamino or diethylamino group, and an imidazolyl group, or an imidazoline group.

Examples of the tertiary amino group-containing alcohol compounds for transesterification include 2-dimethylaminoethanol, 2-diethylaminoethanol,1-(2-hydroxy-3-phenoxypropyl)-2-methylimidazole,1-(2-hydroxy-3-butoxypropyl)-2-phenylimidazoline. Examples of the tertiary amino group-containing amine compounds for ester-amide exchange include tertiary amino group-containing primary or secondary amine compounds such as dimethylaminopropylamine, diethylaminopropylamine, dimethyl aminoethylamine, N-aminoethylpiperazine, N,N-dimethylamino ethylpiperazine.

For improved low-temperature curability of the epoxy resin composition that contains the curing agent of the present invention, the tertiary amino group(s) in the radically polymerized polymer is preferably a dimethylamino group(s).

In the process of radical polymerization of a monomer having both at least a polymerizable double bond and at least a tertiary amino group in the molecule, the produced polymer has the tertiary amino group(s). Examples of the monomers having both at least one polymerizable double bond and at least one tertiary amino group in the molecule are 2-(N,N-dimethylamino)ethyl acrylate, 2-(N,N-dimethylamino)ethyl methacrylate, 2-(N,N-diethylamino)ethyl methacrylate, 3-(N,N-dimethylamino)-propylacrylamide and the like.

In the radical polymerization of the polymerizable double bond-containing monomer, in combination with the above mentioned acrylates, methacrylates, 2-(N,N-dimethylamino)ethyl acrylate, 3-(N,N-dimethylamino)propylacrylamide and others, one or more acrylamides such as N-isopropylacrylamide, acryloylmorpholine, or N,N-diethylacrylamide can be used. The radical polymerization may be effected in any known manner, for example, the monomer system may be heated in the presence of a radical polymerization initiator such as a peroxide or a diazo compound.

If desired, any other radically-polymerizable monomer(s), for example, an olefin such as styrene, or an allyl compound such as allylamine, diallyl phthalate may be copolymerized into the polymer. In addition, if desired, a polyfunctional acrylate and/or methacrylate such as 1,6-hexanediol diacrylate, neopentyl glycol diacrylate, trimethylolpropane triacrylate, ethylene glycol dimethacrylate, or trimethylolpropane trimethacrylate may also be copolymerized into the polymer.

For improved low-temperature curability of the epoxy resin composition that contains the present curing agent, the radical polymer, component (A), preferably has a softening point not higher than 150° C., more preferably not higher than 120° C.

For improved storage stability of the epoxy resin composition, it is desirable that the component (A), (i.e. the radically polymerized polymer of at least one polymerizable double bond-containing monomer, which has at least one tertiary amino group in the molecule) also contains at least one amido (—C(=O)NH$_2$) bond. The polymer may be prepared by radically-polymerizing a monomer having both at least one tertiary amino group and at least one amido bond and also having at least one polymerizable double bond; or by polymerizing an acrylate and/or methacrylate monomer as a part of the monomer to be radically-polymerized, followed by reacting the resulting polymer with an at least one tertiary amino group-containing amine compound for amidation to introduce the tertiary amino group(s) and amido bond(s) into the polymer. Examples of the monomer having both at least one tertiary amino group and at least one amido bond and also having at least one polymerizable double bond are acrylamide compounds having at least one tertiary amino group in the molecule, such as 3-(N,N-dimethylamino)propylacrylamide. As mentioned hereinabove, examples of the tertiary amino group-containing amine compounds are tertiary amino group-containing primary or secondary amine compounds such as dimethylaminopropylamine, diethylaminopropylamine, dimethylaminoethylamine, N-aminoethylpiperazine, and N,N-dimethylaminoethylpiperazine. For improved low-temperature curability of the epoxy resin composition, preferred are dimethylamino group-containing primary or secondary amine compounds such as dimethylaminopropylamine, N,N-dimethylaminoethylpiperazine.

The polymer having at least one hydroxyl group in the molecule, which is component (B) of the curing agent of the present invention, is not specifically defined, so long as it has at least one hydroxyl group in the molecule and its mixture with the other component (A), the radically polymerized polymer of at least one polymerizable double bond-containing monomer, which has at least one tertiary amino group in the molecule, can be solid at 25° C.

The hydroxyl group may be either a phenolic hydroxyl group or an alcoholic hydroxyl group. For improved low-temperature curability of the epoxy resin composition, the hydroxyl group is preferably an alcoholic hydroxyl group.

The component (B), the polymer having at least one hydroxyl group in the molecule may be, for example, radically polymerized polymers of acrylates having at least one hydroxyl group in the molecule and/or methacrylates having at least one hydroxyl group in the molecule; radically-polymerized polymers of polyhydric alcohols such as polyvinyl alcohol, polyvinyl butyral; polymers of polyphenols; condensates of polyhydric alcohols and polycarboxylic acids; phenoxy resins obtained through reaction of a phenolic compound such as bisphenol A or bisphenol S with epichlorohydrin; and polyadducts of epoxy resins and active hydrogen compounds.

Examples of the acrylates having at least one hydroxyl group in the molecule and the methacrylates having at least one hydroxyl group in the molecule are 2-hydroxyethyl acrylate, 4-hydroxybutyl acrylate, 2-hydroxyethyl methacrylate, 2-hydroxypropyl methacrylate, bisphenol A diglycidyl ether/methacrylic acid adduct, and pentaerythritol triacrylate.

Examples of the polymers of polyphenols are, for example, radically polymerized polymers of polyphenols such as para-vinylphenol polymers obtained through polymerizing p-hydroxystyrene; and phenol-novolak resins and resol resins obtained through polycondensation of a phenolic compound such as phenol, cresol, catechol, bisphenol A, bisphenol S, resorcinol, tetrabromobisphenol A or biphenyl, with formalin.

Examples of the condensates of polycarboxylic acid compounds and polyhydric alcohol compounds are polycondensates of adipic acid and pentaerythritol and the like.

The epoxy resin to be reacted with an active hydrogen compound to produce a polyaddition product thereof is a compound having at least two epoxy groups in the molecule. Concretely, it includes glycidyl ethers obtained through reaction of a polyphenol such as bisphenol A, bisphenol F, bisphenol S, hexahydrobisphenol A, tetramethylbisphenol A, hydroquinone, catechol, resorcinol, cresol, tetrabromobisphenol A, trihydroxybiphenyl, benzophenone, bisresorcinol, bisphenol-hexafluoroacetone, tetramethylbisphenol A, tetramethylbisphenol F, tris(hydroxyphenyl)methane, bixylenol, phenol-novolak or cresol-novolak, with epichlorohydrin; polyglycidyl ethers obtained through reaction of an aliphatic polyhydric alcohol such as glycerin, neopentyl glycol, ethylene glycol, propylene glycol, butylene glycol, hexylene glycol, polyethylene glycol or polypropylene glycol, with epichlorohydrin; glycidyl etheresters obtained through reaction of a hydroxycarboxylic acid such as p-hydroxybenzoic acid or β-hydroxynaphthoic acid, with epichlorohydrin; polyglycidyl esters obtained from polycarboxylic acids such as phthalic acid, methylphthalic acid, isophthalic acid, terephthalic acid, tetrahydrophthalic acid, hexahydrophthalic acid, endomethylene-tetrahydrophthalic acid, endomethylene-hexahydrophthalic acid, trimellitic acid or polyfatty acid; glycidylaminoglycidyl ethers obtained from aminophenols or aminoalkylphenols; glycidylaminoglycidyl esters obtained from aminobenzoic acid; and glycidylamines obtained from aniline, toluidine, tribromoaniline, xylylenediamine, diamino cyclohexane, bisaminomethylcyclohexane, 4,4'-diaminodiphenyl methane or 4,4'-diaminodiphenyl sulfone. Of those, preferred are glycidyl ethers obtained through reaction of polyphenols with epichlorohydrin.

The active hydrogen compound is a compound having, in the molecule, at least two active hydrogen atoms capable of reacting with epoxy groups. For example, the compound has a functional group selected from an amino group, a phenolic hydroxyl group, an alcoholic hydroxyl group, a mercapto group, a carboxyl group and a hydrazido group, and has at least two active hydrogen atoms of the group in the molecule. Concretely, it includes amine compounds, for example, aliphatic amine compounds such as cyclohexylamine, piperazine, metaxylylenediamine, 1,3-bis(aminomethyl)cyclohexane, isophoronediamine, diamino cyclohexane, 3,9-bis(3-aminopropyl)-2,4,8,10-tetraoxaspiro[5,5]undecane; tertiary amino group-containing aliphatic primary amine compounds such as dimethylaminopropylamine, diethylaminopropylamine, dimethylaminoethylamine, N-amino ethylpiperazine; aromatic amine compounds such as phenylene diamine, toluylenediamine, diaminodiphenylmethane, diamino diphenyl sulfone; as well as polyphenol compounds such as bisphenol A, bisphenol F, bisphenol S, hexahydrobisphenol A, tetramethylbisphenol A, hydroquinone, catechol, resorcinol, cresol, tetrabromobisphenol A, phenol-novolak resin, resol resin; polyhydric alcohol compounds such as trimethylolpropane, pentaerythritol, tris(hydroxyethyl)isocyanurate; polymercapto compounds such as 2-mercaptoethyl ether; polybasic carboxylic acid compounds such as adipic acid, phthalic acid; hydrazide compounds such as phenylacetohydrazide; amino acid compounds such as alanine, valine; and compounds having at least two different functional groups, such as 1-mercapto-3-phenoxy-2-propanol, mercaptoacetic acid, N-methylethanolamine, diethanolamine, hydroxybenzoic acid, aminobenzoic acid, lactic acid.

One or more of these compounds may be used alone or as combined. Of the active hydrogen compounds, preferred are amine compounds, polyphenol compounds, and polyhydric alcohol compounds. More preferred are tertiary amino group-containing, aliphatic primary amine compounds, and polyphenol compounds.

When an epoxy resin is reacted with such an active hydrogen compound, a monofunctional glycidyl ether compound such as butyl glycidyl ether or phenyl glycidyl ether, a monofunctional glycidyl ester compound such as glycidyl benzoate, or a monoepoxy compound such as styrene oxide may be added thereto, if desired.

In producing it, the polymer of the component (B) having at least one hydroxyl group in the molecule may be copolymerized with a compound not having a hydroxyl group in the molecule. The polymer of the component (B) may contain both an alcoholic hydroxyl group(s) and a phenolic hydroxyl group(s).

For improved storage stability of the epoxy resin composition of the present invention, the polymer of the component (B) having at least one hydroxyl group in the molecule is preferably solid at 25° C. For improved uniformity of the cured product of the resin composition, the polymer of the component (B) is more preferably a reaction product of an epoxy resin and an active hydrogen compound.

Also for improved storage stability of the epoxy resin composition, it is more desirable that the polymer of the component (B) having at least one hydroxyl group in the molecule has a urethane (—OC(=O)NH$_2$) and/or urea (—NHC(=O)NH$_2$) bond(s) in the molecule. Urethane and/or urea bond(s) may be introduced into the polymer molecule, for example, by reacting the polymer having at least one hydroxyl group in the molecule with an isocyanate compound; or by reacting an epoxy resin with an active hydrogen compound and with an isocyanate compound.

The isocyanate compound includes, for example, monoisocyanate compounds such as phenyl isocyanate, octadecyl isocyanate; diisocyanate compounds such as isophorone diisocyanate, metaxylylene diisocyanate, 1,3-bis (isocyanatomethyl)cyclohexane, 2,4-toluylene diisocyanate, 2,6-toluylene diisocyanate, 1,6-hexane diisocyanate, 1,5-naphthalene diisocyanate, 1,4-phenylene diisocyanate, diphenylmethane diisocyanate, which may be in any form of their isomer mixtures; carbodiimide-modified derivatives and biuret-modified derivatives of such isocyanate compounds; and isocyanate prepolymers through reaction of isocyanate compounds and polyol compounds, such as a reaction product of 2,4-toluylene diisocyanate and trimethylolpropane. Diisocyanate compounds are preferred.

For improved low-temperature curability of the epoxy resin composition of the present invention, it is desirable that the softening point of the polymer of the component (B) having at least one hydroxyl group in the molecule is not higher than 150° C., more preferably not higher than 120° C. If the softening point of the polymer of the component (B) is higher than 150° C., the low-temperature curability of the epoxy resin composition will be extremely reduced.

The latent curing agent for epoxy resin of the present invention comprises a solid solution containing the two components (A) and (B). Even though the components have a low softening point and are therefore difficult to grind individually, their solid solution can be readily ground into fine powder and can be uniformly dispersed in an epoxy resin composition. Even if the component (A) alone can be ground and added to an epoxy resin composition, the resulting mixture could not be uniformly cured since the component (A) is poorly miscible with the epoxy resin composition. When the component (A) is combined with the component (B) and forms a solid solution, the solid solution is well miscible with an epoxy resin composition and the epoxy resin composition containing the solid solution can be uniformly cured. On the other hand, the component (B), if added alone to an epoxy resin composition, could not improve both the low-temperature curability and the storage stability of the epoxy resin composition.

In producing the components (A) and (B), a solvent may be used or not, depending on the properties of the starting compounds to be reacted. The solvent is not specifically defined and may be any conventional one. However, if too much solvent remains in the solid solution of components (A) and (B), the properties of the cured product of the epoxy resin composition will be lowered. Therefore, solvents with high-boiling-point are unfavorable. For example, the solvent may be water; alcohols such as methanol, ethanol, isopropanol; ketones such as acetone, methyl ethyl ketone; esters such as ethyl acetate; and aromatic hydrocarbons such as toluene, xylene.

For producing the solid solution of the components (A) and (B), various methods are applicable. For example, the components (A) and (B) may be separately prepared, and may be dissolved in a solvent that dissolves the two, and the solvent may be removed from the resulting solution; or the two components may be heated up to a temperature at which they melt, and then kneaded in melt; or any one of the two components may be first prepared, and the other component may be produced in the presence of the previously-prepared component. Depending on the properties of the respective components, suitable methods are selected for producing the solid solution.

The ratio of the component (A) to the component (B), i.e. (A)/(B), can be between 1/20 and 3/1 by weight. If the ratio of the component (A) is smaller than 1/20, the low-temperature curability of the epoxy resin composition containing the curing agent will be poor, and the composition will fail to attain the advantages of the present invention. On the other hand, if the ratio of the component (A) is larger than 3/1, the storage stability of the epoxy resin composition will be poor.

The solid solution of the invention may be solid at 25° C. If not solid at 25° C., the solid solution will be extremely difficult to be ground, and even if ground, it might not be stored and handled at room temperature and can not be mixed to an epoxy resin composition. Preferably, the softening point of the solid solution falls between 40° C. and 150° C. If the softening point thereof is lower than 40° C., the storage stability of the epoxy resin composition containing the curing agent will be poor; but if higher than 150° C., the low-temperature curability of the resin composition will be poor.

The solid solution of the present invention may contain any other component(s) not adversely affecting the advantages of the present invention. For example, conventional compounds known as a curing agent or a cure accelerator for epoxy resin, such as imidazole compounds including 2-methylimidazole, 1,2-dimethylimidazole, 1-benzyl-2-phenylimidazole, 1-(2-hydroxy-3-phenoxypropyl)-2-methylimidazole; tertiary amine compounds including 2,4,6-tris (dimethylaminomethyl)phenol; phosphine compounds including triphenyl phosphine, may be added in the solid solution, so far as not adversely affecting the advantages of the present invention. The solvent and the catalyst used in producing the components (A) and (B) as well as the non-reacted compounds remaining in the produced components may also exist in the solid solution, so far as not adversely affecting the advantages of the invention.

The solid solution comprised in the curing agent of the present invention is generally ground into particles having a desired particle size for use. The particle size thereof may be from 0.03 μm to 300 μm.

When put on the market, the latent curing agent for epoxy resin of the present invention may further contain, if desired, any known curing agent of, for example, dicyandiamides, hydrazide compounds, guanamine compounds or phenol-novolak resins, as well as other additives such as surface-treating agents, inorganic fillers and pigments.

In another embodiment, the invention provides curable epoxy resin compositions, which comprises an epoxy compound having at least two epoxy groups in the molecule and the latent curing agent for epoxy resin of the present invention.

The epoxy resin may be a compound having at least two epoxy groups in the molecule. It includes all known epoxy resins, for example, glycidyl ethers obtained through reaction of polyphenols, such as bisphenol A, bisphenol F, bisphenol S, hexahydrobisphenol A, tetramethylbisphenol A, diallylbisphenol A, hydroquinone, catechol, resorcinol, cresol, tetrabromo bisphenol A, trihydroxybiphenyl, benzophenone, bisresorcinol, bisphenol-hexafluoroacetone, tetramethylbisphenol A, tetramethylbisphenol F, tris(hydroxyphenyl)methane, bixylenol, phenol-novolak or cresol-novolak, with epichlorohydrin; polyglycidyl ethers obtained through reaction of aliphatic polyhydric alcohols, such as glycerin, neopentyl glycol, ethylene glycol, propylene glycol, butylene glycol, hexylene glycol, polyethylene glycol or polypropylene glycol, with epichlorohydrin; glycidyl ether esters obtained through reaction of hydroxycarboxylic acids such as p-hydroxybenzoic acid or β-hydroxynaphthoic acid, with epichlorohydrin; polyglycidyl esters obtained from polycarboxylic acids such as phthalic acid, methylphthalic acid, isophthalic acid, terephthalic acid, tetrahydrophthalic acid, hexahydrophthalic acid, endomethylenetetrahydrophthalic acid, endomethylene-hexahydrophthalic acid, trimellitic acid, poly fatty acid; glycidylaminoglycidyl ethers obtained from aminophenols or aminoalkylphenols; glycidylaminoglycidyl esters obtained from aminobenzoic acid; glycidylamines obtained from aniline, toluidine, tribromoaniline, xylylenediamine, diamino cyclohexane, bisaminomethylcyclohexane, 4,4'-diaminodiphenyl methane or 4,4'-diaminodiphenyl sulfone; alicyclic epoxy resins such as 3,4-epoxycyclohexylmethyl 3,4-epoxycyclohexane carboxylate; and polyolefin epoxides.

The amount of the latent curing agent for epoxy resin of the present invention to be used in the epoxy resin composition of the present invention may be from 0.3 to 50 parts by weight relating to 100 parts by weight of the epoxy compound in the composition. If the amount of the curing agent therein is smaller than 0.3 parts by weight, the resin composition could not cure sufficiently; on the other hand, if larger than 50 parts by weight, it will adversely affect the properties of the cured product of the resin composition. However, in case where the latent curing agent for epoxy resin of the present invention is used as a cure accelerator for known curing agents, the amount thereof should not be limited to that range.

If desired, the epoxy resin composition of the present invention may contain any other known curing agent(s) of, for example, phenolic compounds, acid anhydrides, dicyandiamides, hydrazide compounds, thiol compounds, guanamines or melamines, as well as a cure accelerator(s) of, for example, imidazole compounds or tertiary amines, in addition to the latent curing agent of the invention. Also if desired, the epoxy resin composition may contain any other additives. Examples of such additives are inorganic fillers such as alumina, silica, calcium carbonate, aluminium hydroxide, magnesium hydroxide, talc, bentonite, barium carbonate, and Aerosil; viscosity adjusters such as acrylic oligomers, silicones; coupling agents such as silane-coupling agents; flame retardants such as phosphates, phosphorus-containing epoxy compounds, and nitrogen-containing phenolic resins; fillers such as nylon particles, polystyrene particles, crosslinked rubber particles, acrylic core/shell particles, rubber-type core/shell particles, silicone particles, and ethylene-acrylic acid copolymer particles; resin modifiers such as carboxyl-terminated, liquid acrylic oligomers; and pigments.

In another embodiment, the present invention provides a method for preparing an article, said method comprising:

(1) applying an epoxy resin composition to at least one surface of a substrate; and (2) curing said epoxy resin composition, wherein said epoxy resin composition comprises:

(a) an epoxy compound with at least two epoxy groups in the molecule: and (b) a latent curing agent, wherein said latent curing agent comprises:

(A) a radically polymerized polymer of a monomer having at least one polymerizable double bond, which polymer has at least one tertiary amino group in the molecule; and (B) a polymer having at least one hydroxyl group in the molecule, and wherein said latent curing agent is a solid solution that is solid at 25° C.

In the present method for forming an article, the latent curing agent and the epoxy resin composition are as described above. The substrate may be of any material conventionally bonded or coated with epoxy resin compositions, including metals, such as steel, copper, bronze, gold, silver, platinum, etc., or a plastic, such as polystyrene, polyamide, polyimide, etc. The article may be any article of manufacture which is conventionally prepared by curing an epoxy resin composition, including electronic devices, such as telephone, computers, electronic games, televisions, audio components, etc. The present epoxy resin composition may be applied to the surface of the substrate manually or by machine in an automated process. The optimum amount of epoxy resin applied will, of course depend on the exact nature of the substrate and article. However, the present epoxy resin compositions are generally used in amounts similar to those used for conventional one-part epoxy resin compositions. After application, the epoxy resin composition may be cured by the application of heat. The optimum temperature and time of the curing step will vary with the exact composition of the epoxy resin composition but may be easily determined on a case-by-case basis.

The present invention is described in more detail with reference to the following Examples, which, however, are not intended to restrict the scope of the invention.

EXAMPLES

Preparation Example 1

110 g of 3-(N,N-dimethylamino)propylacrylamide (Kojin's Product DMAPAA) and 220 ml of isopropyl alcohol were metered into a 1000-ml three-neck flask equipped with a reflux condenser and a stirrer, and heated to 60° C. With stirring still at 60° C., 3.0 g of t-butylperoxy-2-ethylhexanoate (Nippon Yushi's Product Perbutyl O) diluted with 6 ml of isopropyl alcohol was added thereto. Gradually heated, the mixture was refluxed with heating for 2 hours to complete the reaction. Isopropanol was removed by evaporation under reduced pressure, and 3-(N,N-dimethylamino) propylacrylamide polymer was obtained. This was semisolid at 25° C. The absence of 3-(N,N-dimethylamino)propylacrylamide monomer in the polymer was confirmed by $^1$H-NMR.

Preparation Example 2

Dimethylaminoethyl Acrylate Polymer 110 g of N,N-dimethylaminoethyl acrylate (Kojin's Product DMAEA) and 240 ml of toluene were metered into a 1000-ml three-neck flask equipped with a reflux condenser and a stirrer, frozen with degassing, then purged with nitrogen, and heated to 55° C. in a nitrogen atmosphere. With stirring still at 55° C., 3.3 g of 1,1,3,3-tetramethylbutylperoxy 2-ethylhexanoate (Nippon Yushi's Product Perocta O) was added thereto. The mixture was gradually heated to 70° C. over a period of 2 hours, and then refluxed under heat for 2 hours to complete the reaction. Toluene was removed by evaporation under reduced pressure, and N,N-dimethyl aminoethyl acrylate polymer was obtained. This was viscous liquid at 25° C. The absence of N,N-dimethylaminoethyl acrylate monomer in the polymer was confirmed by $^1$H-NMR.

Preparation Example 3

40 g of 3-(N,N-dimethylamino)propylacrylamide polymer produced in Preparation Example 1, which is the component (A) of the latent curing agent of the present invention, and 100 g of bisphenol A-type epoxy resin (Japan Epoxy Resin's Product Epikote 828, having an epoxy equivalent of 190) and 40 g of N-(2-aminoethyl)piperazine, which are the starting materials to give the component (B) of the curing agent, were quickly mixed at room temperature. With controlling the reaction heat, the materials were reacted at 60° C. for 1 hour, and then at 120° C. for 1 hour. The reaction product was a solid solution that was solid at room temperature. This was ground into powder having a mean particle size of 10 microns.

Preparation Example 4

40 g of 3-(N,N-dimethylamino)propylacrylamide polymer produced in Preparation Example 1, which is the component (A) of the latent curing agent of the present invention, and 80 g of bisphenol A-type epoxy resin (Japan Epoxy Resin's Product Epikote 828, having an epoxy equivalent of 190), 40 g of N-(2-aminoethyl)piperazine and 6 g of isophorone diisocyanate, which are the starting materials to give the component (B) of the curing agent, were reacted in the same manner as in Preparation Example 3. The reaction product was a solid solution that was solid at room temperature. This was ground into powder having a mean particle size of 10 microns.

Preparation Example 5

40 g of 3-(N,N-dimethylamino)propylacrylamide polymer produced in Preparation Example 1, which is the component (A) of the latent curing agent of the present invention, and 80 g of bisphenol A-type epoxy resin (Japan Epoxy Resin's Product Epikote 828, having an epoxy equivalent of 190), 40 g of N-(2-aminoethyl)piperazine and 11 g of isophorone diisocyanate, which are the starting materials to give the component (B) of the curing agent, were reacted in the same manner as in Preparation Example 3. The reaction product was a solid solution that was solid at room temperature. This was ground into powder having a mean particle size of 10 microns.

Preparation Example 6

40 g of N,N-dimethylaminoethyl acrylate polymer produced in Preparation Example 2, which is the component (A) of the latent curing agent of the present invention, and 80 g of bisphenol A-type epoxy resin (Japan Epoxy Resin's Product Epikote 828, having an epoxy equivalent of 190), 40 g of N-(2-aminoethyl)piperazine and 6 g of isophorone diisocyanate, which are the starting materials to give the component (B) of the curing agent, were reacted in the same manner as in Preparation Example 3. The reaction product was a solid solution that was solid at room temperature. This was ground into powder having a mean particle size of 10 microns.

Preparation Example 7

125 g of 1-(2-hydroxy-3-phenoxypropyl)-2-methylimidazole, 65 g of 2,4,6-tris(dimethylaminomethyl)phenol and 105 g of bisphenol A were mixed and dissolved at 110° C. To this was added 210 g of bisphenol A-type epoxy resin (Japan Epoxy Resin's Product Epikote 828, having an epoxy equivalent of 190) previously heated at 60° C., and quickly mixed. With controlling the reaction heat, these materials were reacted at 110° C. to 130° C. for 2 hours to obtain a pale yellow solid.

Preparation Example 8

80 g of 3-(N,N-dimethylamino)propylacrylamide polymer produced in Preparation Example 1, which is the component (A) of the latent curing agent of the present invention, and 120 g of the reaction product obtained in Preparation Example 7, which is the component (B) of the curing agent, were mixed in melt at 150° C. The resulting product was a solid solution that was solid at room temperature. This was ground into powder having a mean particle size of 10 microns.

Comparative Preparation Example 1

Using 40 g of N,N-dimethylbenzylamine in place of 3-(N,N-dimethylamino)propylacrylamide polymer, the same process as in Preparation Example 4 was conducted. The resulting product was viscous at room temperature and could not be ground.

Comparative Preparation Example 2

Without using the component (A), 3-(N,N-dimethylamino)propylacrylamide polymer, the same process as in Preparation Example 4 was conducted. Namely, 80 g of bisphenol A-type epoxy resin (Japan Epoxy Resin's Product Epikote 828, having an epoxy equivalent of 190), 40 g of N-(2-aminoethyl)piperazine and 6 g of isophorone diisocyanate were quickly mixed at room temperature, and reacted at 60° C. for 1 hour and then at 120° C. for 1 hour with controlling the reaction heat. The reaction product was a solid solution that was solid at room temperature. This was ground into powder having a mean particle size of 10 microns.

Examples 1 to 4

Using a vacuum grinder (by Ishikawa Kojo), 20 parts by weight of the powder respectively obtained in Preparation Example 3, 4, 6 or 8 with a mean particle size of 10 microns, which serves as a curing agent, 100 parts by weight of epoxy resin (Epikote 828), and 1 part by weight of silica particles (Nippon Aerosil's Product Aerosil #200) were mixed under reduced pressure with degassing to obtain an epoxy resin composition.

Example 5

Using a vacuum grinder (by Ishikawa Kojo), 20 parts by weight of the powder obtained in Preparation Example 5 with a mean particle size of 10 microns, which serves as a curing agent, 100 parts by weight of bisphenol F-type epoxy resin (Japan Epoxy Resin's Product Epikote 807, having an epoxy equivalent of 167), and 1 part by weight of silica particles (Nippon Aerosil's Product Aerosil #200) were mixed under reduced pressure with degassing to obtain an epoxy resin composition.

Comparative Examples 1, 2

An epoxy resin composition was obtained in the same manner as in Examples 1 to 4, for which, however, the product obtained in Preparation Example 7 or Comparative Preparation Example 2 was used as the curing agent.

Evaluation:

The epoxy resin compositions obtained in Examples 1 to 5 as well as Comparative Examples 1 and 2 were tested according to the methods mentioned below to evaluate their curability and storage stability. The test results are given in Table 1.

Test for Curability:

The gel time of each sample at 70° C. was measured; and the adhesive strength under shear of each sample applied to steel sheets and cured at 60° C. for 2 hours was measured. Concretely, a gel time tester No. 153 (by Yasuda Seiki Sangyo) was used for measuring the gel time. The adhesive strength under shear was measured according to JIS K-6850 (1999), and the steel sheets were degreased with acetone before used in the test.

Test for Storage Stability:

The epoxy resin compositions were stored in a thermostat at 25° C., and the number of days in which the viscosity of each sample measured with an E-type viscometer reached twice the initial viscosity thereof was counted.

TABLE 1

| | Curing Agent | Gel Time (70° C.) | Adhesive Strength under shear (cured at 60° C. for 2 hours) | Storage Stability (25° C.) |
|---|---|---|---|---|
| Example 1 | Prep. Example 3 | 530 sec | 500 N/cm² | 85 days |
| Example 2 | Prep. Example 4 | 240 sec | 950 N/cm² | 90 days or more |
| Example 3 | Prep. Example 6 | 400 sec | 680 N/cm² | 60 days |
| Example 4 | Prep. Example 8 | 500 sec | 620 N/cm² | 90 days or more |
| Example 5 | Prep. Example 5 | 420 sec | 630 N/cm² | 90 days or more |
| Comp. Ex. 1 | Prep. Example 7 | 1000 sec or more | not cured | 90 days or more |
| Comp. Ex. 2 | Comp. Prep. Ex. 2 | 900 sec | not cured | 85 days |

As shown in Table 1, the epoxy resin composition of the present invention has improved low-temperature curability and storage stability than conventional ones. Therefore, when used for adhesives, coating materials, sealants, molding materials and composites, its workability is excellent. In addition, since the resin composition rapidly cures even at such low temperatures of 60° C. to 70° C., it is favorable for bonding structures of low heat resistant materials like plastics to which conventional one-package epoxy resin adhesives are not applicable. Further, the resin composition is applicable even in bonding parts of minute instruments that require high dimensional accuracy and in bonding parts of electronic devices sensitive to heat, to which conventional one-package epoxy resin adhesives are not applicable. Still further, since the resin composition rapidly cures even at low temperatures, the energy for curing such adhesives may be reduced. As stated in the above, the epoxy resin composition that contains the curing agent of the present invention has remarkable industrial advantages.

Obviously, numerous modifications and variations of the present invention are possible in light of the above teachings. It is therefore to be understood that, within the scope of the appended claims, the invention may be practiced otherwise than as specifically described herein.

The entire disclosure of Japanese Patent Application No.2001-145801 filed on May 16, 2001 including specification, claims and summary is incorporated herein by reference in its entirety.

The invention claimed is:

1. A latent curing agent for epoxy resin, which comprises:
   (A) a radically polymerized polymer of a monomer having at least one polymerizable double bond, which polymer has at least one tertiary amino group in the molecule, and
   (B) a polymer having at least one hydroxyl group and at least one urethane and/or urea bond in the molecule, and wherein said latent curing agent is solid at 25° C.;
   wherein said radically polymerized polymer of a monomer having at least one polymerizable double bond and said polymer having at least one hydroxyl group in the molecule are present in a weight ratio of 1:20 to 3:1.

2. The latent curing agent for epoxy resin of claim 1, wherein said radically polymerized polymer of a monomer having at least one polymerizable double bond also contains at least one amido bond.

3. The latent curing agent for epoxy resin of claim 1, wherein said polymer having at least one hydroxyl group and at least one urethane and/or urea bond in the molecule is solid at 25° C.

4. The latent curing agent for epoxy resin of claim 3, wherein said polymer having at least one hydroxyl group and at least one urethane and/or urea bond in the molecule is a reaction product of an epoxy resin, an active hydrogen compound and an isocyanate compound.

5. The latent curing agent for epoxy resin of claim 1, wherein said radically polymerized polymer of a monomer having at least one polymerizable double bond has a softening point not higher than 150° C.

6. A method for preparing an article, said method comprising:
   (1) applying an epoxy resin composition to at least one surface of a substrate; and
   (2) curing said epoxy resin composition, wherein said epoxy resin composition comprises:
      (a) an epoxy compound with at least two epoxy groups in the molecule: and (b) a latent curing agent,
wherein said latent curing agent comprises:
(A) a radically polymerized polymer of a monomer having at least one polymerizable double bond, which polymer has at least one tertiary amino group in the molecule; and
(B) a polymer having at least one hydroxyl group and at least one urethane and/or urea bond in the molecule,
wherein said latent curing agent comprises said radically polymerized polymer of a monomer having at least one polymerizable double bond and said polymer having at least one hydroxyl group in the molecule in a weight ratio of 1:20 to 3:1,
and wherein said latent curing agent is a solid at 25° C.

7. The method of claim 6, wherein said radically polymerized polymer of a monomer having at least one polymerizable double bond also contains at least one amido bond.

8. The method of claim 6, wherein said polymer having at least one hydroxyl group and at least one urethane and/or urea bond in the molecule is solid at 25° C.

9. The method of claim 6, wherein said polymer having at least one hydroxyl group and at least one urethane and/or urea bond in the molecule is a reaction product of an epoxy resin, an active hydrogen compound and an isocyanate compound.

10. The method of claim 6, wherein said radically polymerized polymer of a monomer having at least one polymerizable double bond has a softening point not higher than 150° C.

11. The method of claim 6, wherein said latent curing agent is present in said epoxy resin composition in an amount of 0.3 to 50 parts by weight based on 100 parts by weight of said epoxy compound.

12. The latent curing agent for epoxy resin of claim 1, wherein said radically polymerized polymer of a monomer having at least one polymerizable double bond, which polymer has at least one tertiary amino group in the molecule, is a 3-(N,N-dimethylamino)propylacrylamide polymer.

13. The latent curing agent for epoxy resin of claim 1, wherein said polymer having at least one hydroxyl group and at least one urethane and/or urea bond in the molecule, is the adduct of a bisphenol A epoxy resin and N-2-aminoethylpiperazine and isophorone diisocyanate.

14. The latent curing agent for epoxy resin of claim 1, wherein
said radically polymerized polymer of a monomer having at least one polymerizable double bond, which polymer has at least one tertiary amino group in the molecule, is a 3-(N,N-dimethylamino)propylacrylamide polymer and
said polymer having at least one hydroxyl group and at least one urethane and/or urea bond in the molecule, is the adduct of a bisphenol A epoxy resin and N-2-aminoethylpiperazine and isophorone diisocyanate.

15. The method of claim 6, wherein said radically polymerized polymer of a monomer having at least one polymerizable double bond, which polymer has at least one tertiary amino group in the molecule, is a 3-(N,N-dimethylamino)propylacrylamide polymer.

16. The method of claim 6, wherein said polymer having at least one hydroxyl group and at least one urethane and/or urea bond in the molecule, is the adduct of a bisphenol A epoxy resin and N-2-aminoethylpiperazine and isophorone diisocyanate.

17. The method of claim 6, wherein
said radically polymerized polymer of a monomer having at least one polymerizable double bond, which polymer has at least one tertiary amino group in the molecule, is a 3-(N,N-dimethylamino)propylacrylamide polymer and
said polymer having at least one hydroxyl group and at least one urethane and/or urea bond in the molecule, is the adduct of a bisphenol A epoxy resin and N-2-aminoethylpiperazine and isophorone diisocyanate.

* * * * *